（12）United States Patent
Iliev

(10) Patent No.: US 7,111,426 B2
(45) Date of Patent: Sep. 26, 2006

(54) DEVICE FOR WINDING AND UNWINDING THE LOWER PART OF FISHING LINE

(76) Inventor: Vojislav Iliev, Bistrec 12 Lug Samoborski, Bregana (HR) 10432

( * ) Notice: Subject to any disclaimer, the term of this patent is extended or adjusted under 35 U.S.C. 154(b) by 0 days.

(21) Appl. No.: 11/032,239

(22) Filed: Jan. 5, 2005

(65) Prior Publication Data
US 2005/0198890 A1 Sep. 15, 2005

Related U.S. Application Data

(63) Continuation of application No. PCT/HR02/00066, filed on Dec. 24, 2002.

(30) Foreign Application Priority Data
Feb. 28, 2002 (HR) .............................. P20020190A

(51) Int. Cl.
*A01K 85/00* (2006.01)
(52) U.S. Cl. ...................................... 43/42.02; 43/26.2
(58) Field of Classification Search ............... 43/42.02, 43/26.1, 26.2
See application file for complete search history.

(56) References Cited

U.S. PATENT DOCUMENTS

| | | | |
|---|---|---|---|
| 1,758,160 A * | 5/1930 | Lee | .............. 43/26.2 |
| 2,950,559 A | 8/1960 | Nelson | |
| 4,068,401 A * | 1/1978 | Saitoh | .......... 446/158 |
| 4,674,223 A | 6/1987 | Pearce | .......... 43/26.2 |
| 4,831,767 A | 5/1989 | Pearce | .......... 43/26.2 |
| 5,029,410 A | 7/1991 | Anderson | .......... 43/44.9 |
| 5,035,075 A | 7/1991 | Pearce | .......... 43/26.2 |

FOREIGN PATENT DOCUMENTS

WO WO88/10067 12/1988

* cited by examiner

*Primary Examiner*—Kurt Rowan
(74) *Attorney, Agent, or Firm*—Jacobson Holman PLLC

(57) ABSTRACT

Device for winding and unwinding the lower part of fishing line (cast) is a part of equipment for fishing with hook, by which it is solved the problem of visibility in water of lower reinforced parts of lines made of materials visible in water. These parts represent one of the most loaded parts of fishing equipment, because they are subjected to large tensile and gliding stresses. The device includes a two-part housing in which there is the hollow cylinder on which the reinforced lower part of the line is wound by a blade coil spring. In the stage of attracting the fish, the reinforced lower part of the line remains invisible and in the stage of swallowing, tearing and pulling the bait with the device, reinforced lower part of the line is pulled out of the device. The pulled out, reinforced lower part of the line cannot be bitten through or torn off by the fish, that enables the reliable catch. The device is used as the bait and model or insert for natural and artificial fishing baits for fishing predatory freshwater and sea fish.

3 Claims, 3 Drawing Sheets

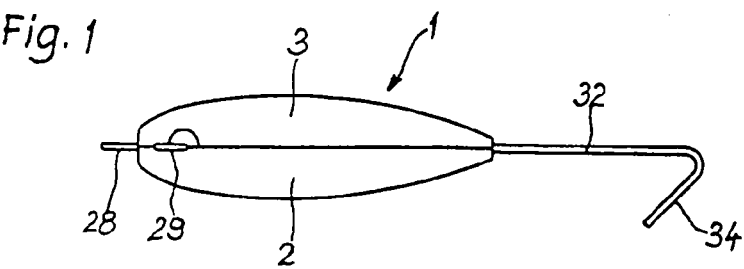
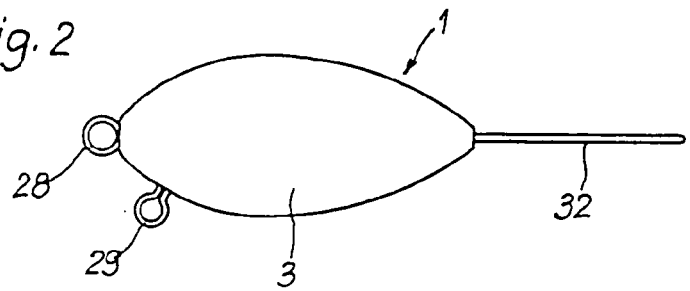
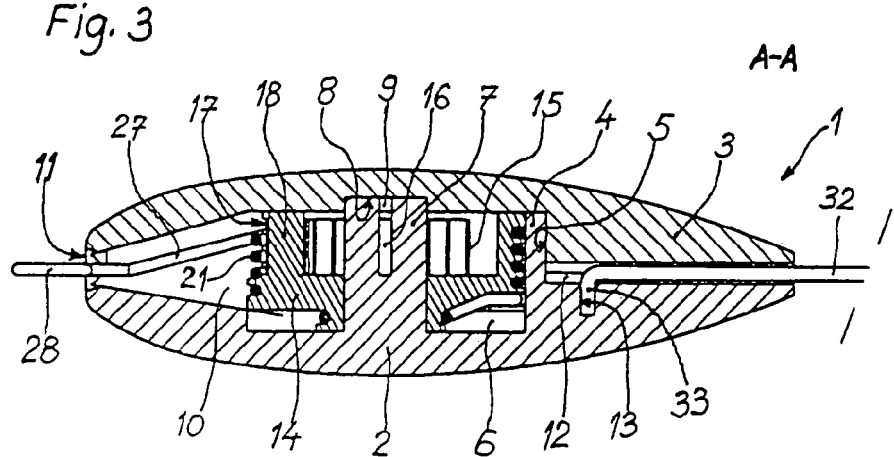
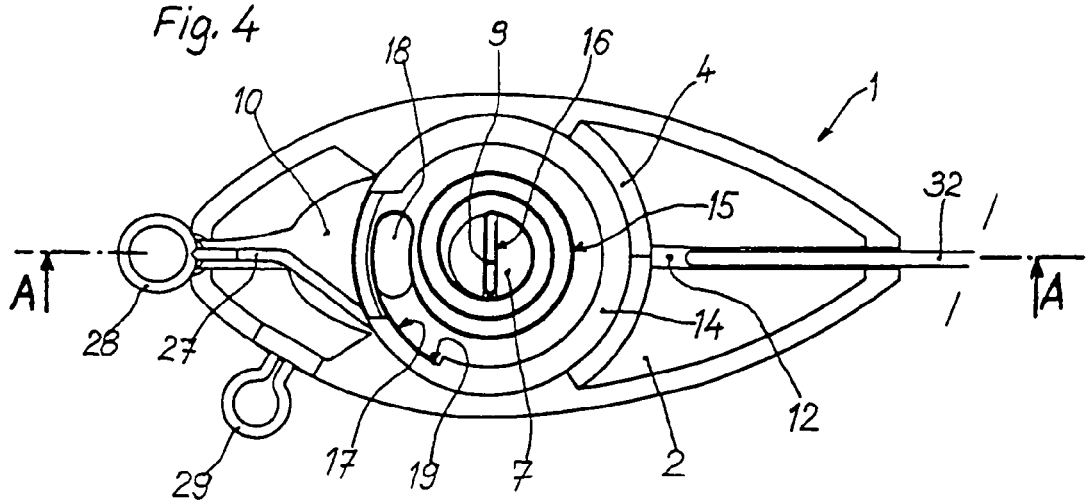

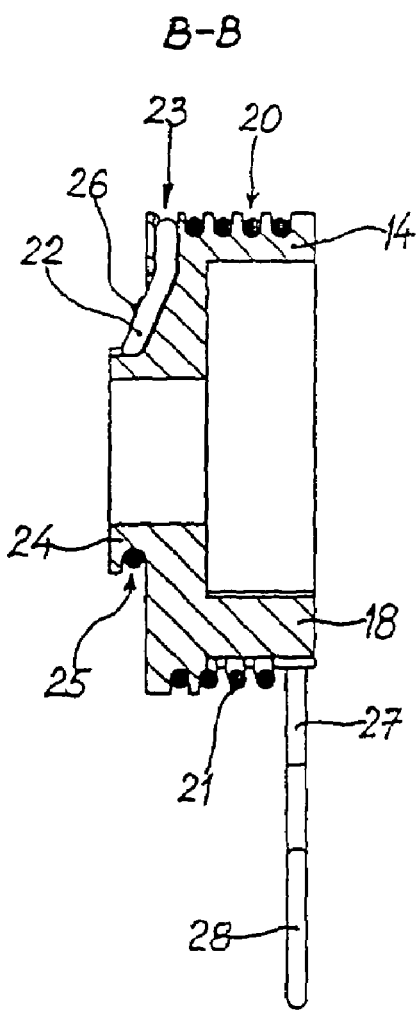
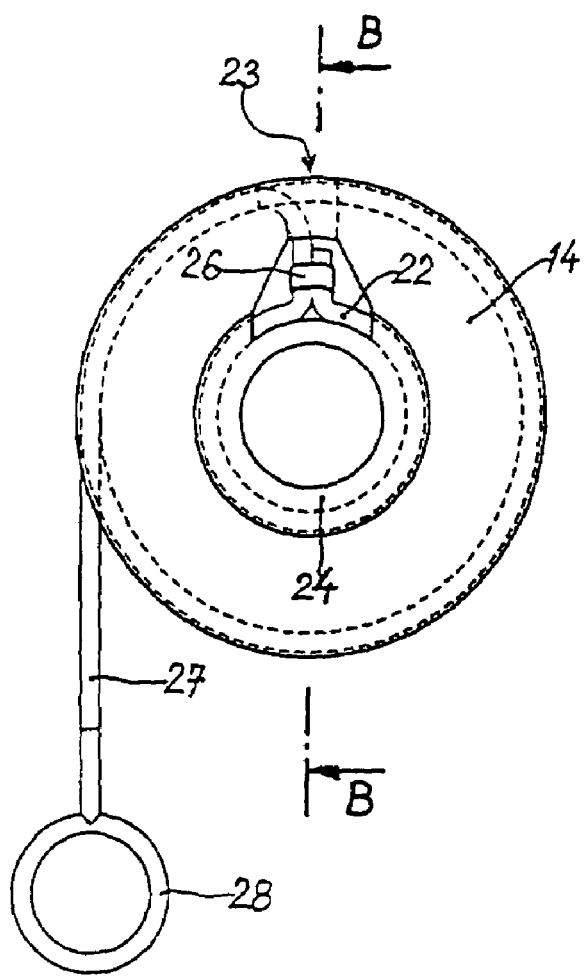
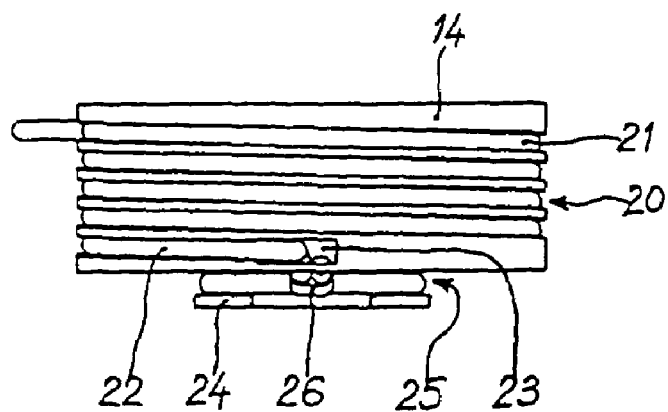

DEVICE FOR WINDING AND UNWINDING THE LOWER PART OF FISHING LINE

This is a continuation of PCT/HR02/00066 filed Dec. 24, 2002 and published in English.

FIELD OF THE INVENTION

The subject of the invention is a device for winding and unwinding a lower part of a fishing line, used as a bait or insert for natural and artificial fishing baits for fishing predatory freshwater and sea fish.

According to the seventh edition of the International Classification of Patents, the invention belongs to the following fields, marked as follows:

A01K-91/14—casts,

A01K-91/16—casts for fishing bait throwing,

A01K-91/06—devices on lines that are not foreseen on another place, e.g. for automatic hook piercing, A01K-91/08—devices on lines for angling by dragging, A01K-91/10—devices on lines for automatic hook's piercing, and A01K-83/06—devices for holding baits on the hook.

BACKGROUND OF THE INVENTION

Fishing by hook of predatory fresh water and sea fish is from an economic standpoint the most profitable and from a sports standpoint, the most attractive. Predatory fish belong to a range of largest and strongest fish for which special equipment is required, in order to attract fish of prey and to hold them on a hook till drawing them out of the water. Predatory fish have in their jaws bone growths in the form of teeth for cutting and tearing their catch. Therefore these lower parts of line resp. casts, represent one of the most loaded part of fishing equipment for fishing predatory fish, because they are subjected to large tensile and gliding strains. Lines in general should be made of transparent materials, invisible in water, so that bait on lines would leave as natural an impression as possible. As there are not available materials for line with high tensile and gliding strength invisible in water, the lower, most strained parts of line are made of nontransparent, metal materials. Visible casts made of metal protruding from artificial or natural bait, decrease the attractiveness of the bait and thus the entire fishing event as an economic or sport activity. Therefore it is a technical problem of a device of manufacture that the lower reinforced nontransparent metal part of the line, be made invisible in a stage of attracting fish and effective and resistant to tensile and gliding strains in stages of swallowing, pulling off and dragging the bait.

BACKGROUND ART

In the modem market of fishing equipment, there are lower parts of a line (casts), so called pre-lines (a part of the line next to the hook), as reinforced line parts by which there is solved the technical problem of tensile and gliding strength of these most loaded parts of the lines. Pre-lines are made of metal, mostly steel wires with high mechanical and corrosion-resistant characteristics. The problem of visibility of pre-lines in water is solved by reducing their thickness which decreases their mechanical characteristics and decoration, which make them more expensive as products.

In the family of patent documents including WO8810067, EP0321465, U.S. Pat. No. 5,035,075, U.S. Pat. No. 4,831,767, U.S. Pat. No. 4,674,223 and JP2500561T, there is described an artificial bait with a mechanism for setting in motion parts of bait imitating fish fins or frog legs. The mechanism consists of a reel, on which there is wound a lower part of a line and which is fixedly supported on the rotating axis of the blade coil spring of the mechanism for transport and transformation of rotational motion of the axis into alternate motion of bait limbs, spring housing and transport mechanism, as well as the limbs of the bait themselves. All parts of the mechanism, except limbs, are arranged in the bait. The motion of bait limbs is made by pulling the line out of the bait, whereby the line is unwound from the reel and the blade coil spring is strained. The line is wound on the reel by means of a blade coil spring, which inner movable part is fixed to the rotation axis and the external fixed end to the fixed housing of the spring and transport mechanism.

By pulling the lower part of a line (cast) the bait is dragged, which is because of water resistance, moving slower than the line itself. Through it, the line is unwound from the reel for the length that is equal to the difference of passed paths of the line and the bait. When the tensile strength in the line becomes smaller than the resistance strength of water, having effect to the bait, the blade coil spring releases accumulated potential energy and pulls the line into the bait, whereby it is wound on the reed reel again. By alternating pulling the line from the bait and its pulling in by means of the blade coil spring, motion of the bait limbs take place.

The described mechanism has been exclusively intended for setting in motion parts of artificial bait, imitating limbs of natural bait when the bait is moving through the water. The lower part of line winding and unwinding on the reel is not the subject of patent protection.

The patent document U.S. Pat. No. 2,950,559 describes artificial bait with the device for winding and unwinding the lower part of a fishing line. The bait consists of g two-part housing in which the spring mechanism is placed. The housing consists of the front imitating the head of a fish and the rear part imitating the body of a fish. The spring mechanism consists of lifting tackle around which there is wound the lower part of a fishing line and two drawing ropes strained by the pressure spring installed in the housing body. This solution of winding and unwinding the lower part of fishing line is not in any constructional detail of the housing or spring mechanism similar to the solution contained in this invention.

The patent document U.S. Pat. No. 5,029,410 also describes artificial bait with the device for winding and unwinding the lower part of a fishing line. The bait consists of a two-part housing in which there is put the spring mechanism with the device for fixing the position of the lower part of a fishing line.

Along a longitudinal vertical symmetry plane, the housing is divided in the left and right half between which there is installed the spring mechanism. The spring mechanism consists of a double lifting tackle on the axis, bedded in the housing. On one lifting tackle there is wound a rubber ribbon or spring and on the lower part of a fishing line. A movable end of a rubber ribbon or spring is fastened to the lifting tackle axis and the fixed end to the bait housing. This solution is in some constructional details of housing similar to the solution contained in this invention. However, the constructional solutions of the spring mechanisms are fully different. In the solution described in the patent document U.S. Pat. No. 5,029,410 transfer of strengths and movements from the rubber ribbon or spring to the lower part of fishing line and vice versa is done through the double lifting tackle on the rotation axis, whereas in the solution described in this invention, transfer of strengths and movements from the spring to the lower part of the fishing line and vice versa is done through a hollow cylinder on the fixed axis. The spring is on the whole installed in the hollow cylinder and the lower part of fishing line is led by grooves on the external surface of a cylinder collar. The constructional solution of the spring mechanism according to the invention makes this device simpler and more reliable than the solution described in U.S. Pat. No. 5,029,410.

SUMMARY OF THE INVENTION

The device for winding and unwinding the lower part of the fishing line according to the invention, consists of a two-piece shell-like housing in which the spring mechanism is arranged, for pulling in the lower, reinforced line into the housing or pulling the lower, reinforced part of the line out of the housing. The spring mechanism consists of a hollow cylinder supported on a fixed axis, fastened to one half of the housing and blade coil spring put in the hollow in the cylinder. The internal fixed end of the spring is fastened to the fixed axis of the cylinder and its movable external end to the ring of the cylinder. By direct connection of the cylinder and spring, the interacting transfer of motion from the cylinder to the spring and from the spring to the cylinder, takes place. On the ring of the cylinder there is a spiral groove for the line. The inner part of a line is pulled through the radial opening on the ring of a cylinder, wound around the bearing sleeve of the cylinder and fastened with the stirrup to the line. The joined piece of the line is wound in the groove on the ring of the cylinder. The external end of the line ends with a ring leaning against the external part of the opening for a line on the housing of a device.

When the bait with the device is in a passive state of resting or moving through the water when water resistance force is smaller than the pretension of the spring, the lower part of the line remains completely wound round the ring of the cylinder. The ring of the external end of the line is then leaned toward the external part of the opening for line on the housing of the device because of the effect of pretension force in the spring. In this way the whole lower part of the line is invisible, because it is wound in a relatively small housing of a device that makes a part of the bait which has the effect of attracting fish and is not disturbed by the visible lower part of a line.

By strongly dragging the bait backward or sideward, what is happening when the fish swallows, tears and drags the bait, the lower part of a line is drawn out of the device. In the field of effect of a fish jaw, there is the pulled out, reinforced lower part of the line that cannot be bitten or torn off by a fish. In this way reliable fishing is enabled without damage to equipment and loss of a catch.

Because of spring force effect in the device, the fish caught on the bait with this device is by additional spring force pulled forward which diminishes the possibility of escape from the bait.

The device for winding and unwinding of the lower part of a line (cast) for fishing belongs to bait or type of device for holding bait on a hook, that are inserted in natural or artificial bait or to which natural or artificial bait is fastened. The device in the form of an insert represents the universal part, applicable for all types of bait fastened to the lower part of lines with a high tensile and gliding strength that are invisible in the stage of attracting fish.

By the device, the set aim of finding the solution for invisibility in water of a lower, reinforced, nontransparent metal part of the line in a stage of attracting fish and effective and resistant to high tensile and gliding stresses in stages of swallowing, tearing and pulling the bait is achieved in the whole, by which the total exploitability of fishing equipment is increased.

The solution according to the invention solved the problem of effectiveness of bait attractiveness and effectiveness of the lower part of a line, whereas by the solution described in the mentioned family of patent documents there is solved only the problem of effectiveness of bait attractiveness. By the solution according to the invention in relation to the solution described in the mentioned family of patent documents, the set aim of increasing the effectiveness of bait attractiveness is achieved in essentially a different way, with essentially different construction and with essentially different effects of these solutions.

Attractiveness of the bait in the solution described in the mentioned patent family is solved by setting in motion limbs of a bait only when it is moving through the water, whereas the same problem in the described invention is solved by pulling the lower visible part of a line into the bait when the bait is either resting in water or moving through water.

The solution described in the mentioned family of patent documents consists of a device consisting of complex multipart spring mechanisms in which the reel and spring are separated and in which there is arranged the movable internal end of a spring and the axis fastened to the external end of a spring. Fastening of the internal end of a line and its conducting on the strake of the reel is not clearly defined. The mechanism for transfer of rotation motion of the spring mechanism axis to the oscillating motion of bait limbs is a complex and expensive mechanism. The spring mechanism of the solution according to the invention consists of the cylinder and spring arranged in the cylinder. The fixed internal end of a spring is fastened to the fixed axis and the movable external end of the spring directly to the cylinder strake. Fastening of the internal end of line and its conducting on the strake of a reel is clearly defined and does not allow the line getting stuck and overstressing the spring outside the field of elastic deformation.

By the solution according to the invention in relation to the solution described in the mentioned family of patent documents, except improving the effect of bait attractiveness in resting position and movement, there is also achieved the effect of increase of mechanical characteristics of the lower line part (cast). According to the invention, the lower line part may have a significantly larger cross-section than the cast and could be made of materials, visible in water, resistant to large tensile and gliding stresses as e.g. metal materials, whereas in the solution described in the mentioned family of patent documents, the cast is not the matter of patent protection.

BRIEF DESCRIPTION OF THE FIGS.

FIG. 1 shows the design of the device for winding and unwinding the lower part of the fishing line.

FIG. 2 shows the layout of the device for winding and unwinding the fishing cast (lower part of the fishing line).

FIG. 3 shows the cross-section A—A of the device for winding and unwinding the lower part of the fishing line from FIG. 4.

FIG. 4 shows the view on the inside of a lower part of a housing of the device with spring mechanism and line.

FIG. 5 shows the cross-section B—B from FIG. 6 of the cylinder with the line.

FIG. 6 shows the design of the cylinder with the line with a view to the bearing sleeve of the cylinder and the internal end of the lower part of a line (cast).

FIG. 7 shows the layout of the cylinder with line.

DETAILED DESCRIPTION OF THE PREFERRED EMBODIMENTS

Figure 8:
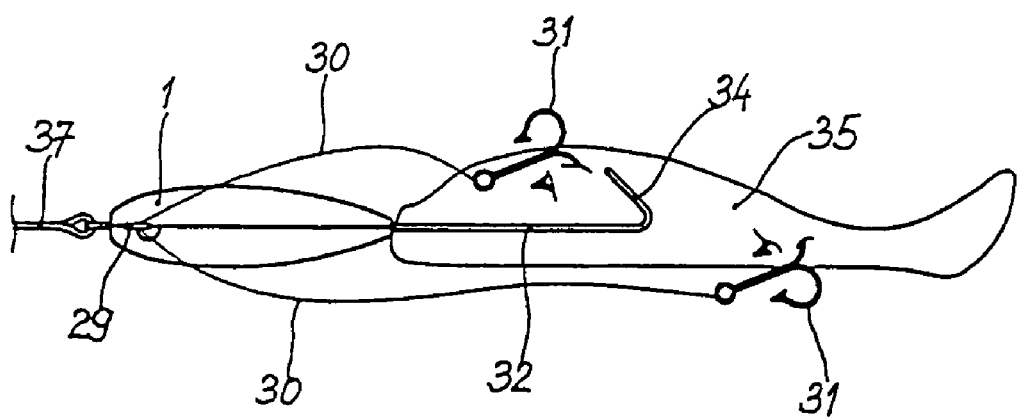
FIG. 8 shows the layout of the device for winding and unwinding the lower part of fishing line with artificial or natural bait fastened to the device.

A device 1 for winding and unwinding the lower part of fishing line (cast) shown in FIGS 1 to 7, consists of a housing, spring mechanism, lower line part (cast) and parts for acceptance of bait and hooks.

The housing has a form of an extended shell consisting of the lower 2 and upper part 3, which external mantles are symmetrical and which are removably connected. The connection of the lower part 2 of housing and the upper part 3 of the housing is made as a tight seat connection of internal overhangs 4 of one part entering in recesses in the other part of a housing. In the widest part of a housing there is a cylindrical hollow 6 for arrangement of a spring mechanism. In the middle of the hollow 6 there is the axis 7, which lower part is removably connected with the lower part 2 of the housing and which free upper end enters in the recess 8 in the upper part 3 of the housing. In the upper part of the axis 7 there is the slot 9 whose depth is larger than the half of the length of the axis 7. In the front part of the housing there is the axial channel 10 by which the hollow 6 is connected with the outlet opening 11. In a part of the housing there is an axial bore hole 12 with vertical hole 13 in the lower part 2 of the housing. The housing is made of water resistant materials such as polymeric materials.

In the cylindrical hollow 6 of the housing there is arranged the spring mechanism consisting of the hollow cylinder 14 rotationally bedded on the axis 15 turned to the upper part 3 of the housing. The internal, fixed end 16 of the spring 15 is inserted in the slot 9 on the upper part of the axis 7 and its external, moveable end 17 is wound round the tooth 18 on the strake of cylinder 14 in the opposite direction from the direction of the spring curve 15 and tightened on the internal area 19 of the cylinder strake 14.

On the external area of the cylinder ring 14 there is curved groove 20 around which the lower part of the line 21 is wound. Internal end 22 of the line 21 is dragged through the radial opening 23 on the cylinder ring 14, wound around the bearing sleeve 24 in the groove 25 and fastened by the stirrup 26 to the line 21. The external end 27 of the line 21, dragged through the channel 10 of the housing ends with the ring 28 leaning against the opening 11 of the housing. In the initial position, the spring 15 is wound in the way, that the external end 27 of the line 21 which is through the ring 28 leaning against the opening 11 of the housing is under pretension force. The pretension force of the spring 15 should be higher than the weight of the device with the bait in the water and higher than water resistance force to the motion of the device with bait through the water. Under such circumstances, the lower part (cast) of line 21 shall in all use circumstances be pulled in the device and invisible to the catch.

In the utmost pulled out position, the lower part of a line 21 shall be completely unwound from the cylinder 14, to which it remains connected through the sleeve 24 by the internal end 22. When unwinding the line 21 from the cylinder 14, the spring 15 in which the force is increasing, shall wind up. In order that the lower part of the line (cast) 21 could unwind from the cylinder 14 in the whole, the work deflection of the spring 15 represents the total deflection of the spring 15, reduced for the pretension deflection, to be larger than a wound length of the lower part of line 21, in order to correct functioning of the spring 15 in the field of elastic deformation. In the utmost pulled out position, to which it comes in the case of a heavy catch, the total weight force of device, bait and catch, as well as water resistance is transferred by the lower part of line 21 over the sleeve 24 to the axis 7. In this way, at the time of highest tensile forces, the cylinder strake 14 is disburdened and axis 7 as the strongest part of the device, is loaded. Upon disappearance of external tensile forces, the strained spring 15 pulls the lower part of line 21 in the device, whereby it is wound on the strake of cylinder 14, until the ring 28 does not lean again against the opening 11 of the housing.

Parts of the spring mechanism and the lower part of line 21 and associated parts should also be made of water resistant materials such as polymeric materials and corrosion resistant metal materials. For cylinder 14 it would be best to manufacture it of water resistant polymeric materials, whereas blade coil spring 15, lower part of the line 21, stirrup 26 and ring 28, should be made of corrosion resistant steel materials with high tensile and gliding strength.

In the front part of the device housing there is fastened the metal stirrup 29, to which by short lines 30 there is the connected one or more metal hooks 31. In the axial bore hole 21 of the housing there is inserted the bearing 32 bait in the form of a metal rod, which internal end 33 is bent under right angle and inserted in the vertical hold 13 in the lower part 2 of the housing. The external end 34 of the bearing 32 is bent under an angle exceeding 90° in the hook for bait.

DESCRIPTION OF APPLICATION

Figure 9:
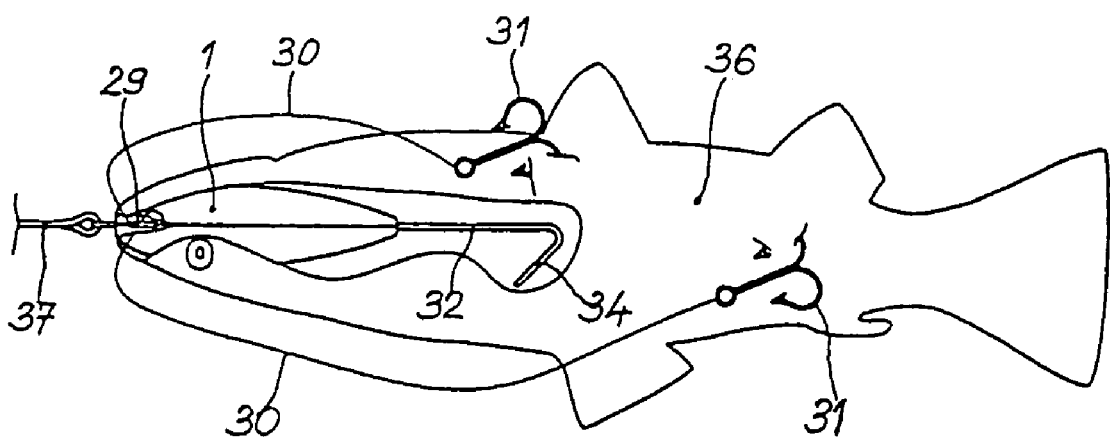
FIG. 9 shows the device for winding and unwinding the lower part of the fishing line, inserted in the artificial or natural bait.

Examples of application of the devices are shown in FIGS. 8 and 9.

The described device for winding and unwinding the lower part of a fishing line, may use independent artificial bait, as the insert is applicable to all kinds of artificial or natural bait.

The device 1 may be used as an independent artificial bait. In this case, the housing of the device 1 should be shaped in a way, that by its external appearance it imitates one of natural bait. The device 1 may be used as a model of artificial or natural bait 35, as it is shown in FIG. 8. The artificial or natural bait 35 is pulled on the support 32 up to the housing of the device. By hooked end 34 of the support 32 and hooks 31, the bait 35 is connected to the device 1, that is over the ring 28 tied to the upper part 37 of the line, tied to the fishing rod.

The device 1 may be used as the an insert in artificial or natural bait 36, as it is shown in FIG. 9. Through the mouth of the bait 36 there is inserted the whole device 1, which is by the hooked end 34 of the support 32 and hooks 31, is fastened to the bait 36. The device 1 is over the ring 28 tied to the upper part 37 of the line, tied to the fishing rod.

The invention claimed is:

1. Device for winding and unwinding a lower part of a fishing line, said device comprising a two-part housing in a form of an elongated shell consisting of a lower part and an upper part which are symmetrical and mutually removably connected by a tight seating connection of internal overhangs of one part of the housing entering concavities in another part of the housing in which in a widest part there is a cylindrical hollow and in a front there is an axial canal by which the cylindrical hollow is connected to an output opening and on which front there is anchored a metal stirrup to which there is connected one or more metal fish hooks, the cylindrical hollow having an axis with a free upper end entering in a concavity in the upper part of the housing with a slot whose depth exceeds half of a length of the axis, and along the axis there is a rotationally bedded hollow cylinder, and a laminar coil spring having an internal, fixed end inserted in the slot on the upper part of the axis and an external, movable end being wound around a tooth on a cylinder brim in a direction contrary to a direction of a spring bend and stretched on an internal surface of the cylinder brim and on an external surface of a cylinder collar there is a coil groove in which there is wound the lower part of the fishing line whose internal end is pulled through a radial opening on the cylinder collar and wound around a bearing plug in a groove and fixed with the stirrup, the fishing line and an external end of the fishing line is pulled through the axial canal of the housing and connected to a ring leaning against an opening of the housing and in a rear part of the housing there is an axial bore hole vertically extending in the lower part of the housing in which there is inserted a support for bait in a form of a metal rod having an internal end bent into a rectangle and inserted in a vertical hole in the lower part of the housing and an external end is bent into an angle exceeding 90° into a hook for retaining bait.

2. The device for winding and unwinding the lower part of the fishing line according to the claim 1, wherein a whole lower part of the fishing line with the internal end and external end, is made of water resistant, chemically stable in fresh and sea water, flexible material, whose thickness is identical to or different from a thickness of an upper part of the fishing line and has a tensile and shear strength of the lower part of the fishing line exceeding tensile and shear strength of the upper part of the fishing line.

3. The device for winding and unwinding the lower part of the fishing line according to claim 1, wherein independent artificial bait is used which by external appearance imitates natural bait or as a pattern of artificial or natural bait or as an insert in artificial or natural bait through the ring linked to an upper part of the fishing line.

* * * * *